Patented June 24, 1947

2,422,904

UNITED STATES PATENT OFFICE 2,422,904

METHOD OF PREPARING $\Delta^{1,4}$-ANDROSTADI-ENOL-17-ONE-3 AND ITS DERIVATIVES Hans Herloff Inhoffen, Berlin-Wilmersdorf, and Gerhard Zühlsdorff, Berlin N. 65, Germany, assignors to Schering Corporation, Bloomfield, N. J., a corporation of New Jersey No Drawing. Application February 11, 1941, Serial No. 378,378. In Germany May 29, 1936

7 Claims. (Cl. 260—397.4)

This invention relates to the $\Delta^{1,4}$-androstadienol-17-one-3, its derivatives and methods of preparing them.

In U. S. application Serial No. 145,052 there is described a process for the preparation of steroid ketones which are twofold unsaturated in ring A, said process consisting in treating steriod ketones-3 polyhalogenated in ring A with means capable of splitting off halogen atoms, thereby introducing two double bonds in ring A. This treatment consists for example in heating said halogen compounds with salts of organic acids, preferably in the presence of solvents for these salts which have a higher boiling point, for example, in the presence of butanol, acetic acid, benzoic acid, iso-valeric acid and so on. But likewise treatment with ammonia or organic bases yields the same result.

The present invention relates also to valuable steroid ketones which are twofold unsaturated in ring A, and more especially to the $\Delta^{1,4}$-androstadienol-17-one-3. It relates also to the derivatives of said compound wherein the 17-hydroxy group is replaced by groups convertible thereinto with the aid of hydrolysis, especially its ester.

The process consists in treating an androstanol-17-one-3, dihalogenated in ring A, with means capable of splitting off halogen-hydride, whereby two double bonds are introduced in ring A. For this purpose methods are employed as they are described in the above mentioned U. S. application Serial No. 145,052. See also British Patent No. 500,353.

One of the features of the present invention resides in the use of collidine as the organic base for splitting off of hydrogen halide from the starting compound which is doubly halogenated in ring A, as with such base higher temperatures of reaction can be attained and a more efficient removal of hydrogen halide secured than with the lower boiling organic bases described in the above-mentioned application and patent.

In the same manner derivatives of the 17-hydroxy group of said androstanol-17-one-3 may be reacted.

The invention relates further to the production of 17-derivatives of said $\Delta^{1,4}$-androstadienol-17-one-3 by treating said $\Delta^{1,4}$-androstadienol-17-one-3 with means capable of forming said derivatives, for instance, by esterification, etherification and the like.

It relates further to the production of $\Delta^{1,4}$-androstadienol-17-one-3 from the 17-hydroxy-derivatives thereof by means capable of converting said derivatives to the $\Delta^{1,4}$-androstadienol-17-one-3.

As starting materials according to the process of the present invention androstanol-17-one-3, halogenated in position 1,4 or 2,4 or 1,5 or 2,5 may be employed, especially the 2,4 dichloro- and 2,4-dibromo-androstanol-17-one-3, as well as their 17-derivatives, preferably their 17-esters.

The means capable of splitting off halogen-hydride are the means mentioned in the copending application Serial No. 145,052, for example treatment with ammonia or organic bases, like pyridine, piperidine or quinoline, or with aliphatic or aromatic amines, like dimethylaniline, dimethylamine and so on. Especially suitable is the treatment with collidine, by which the products of the process are obtained in a very good yield.

The treatment is performed for instance with suitably anhydrous bases, if necessary in the presence of a solvent in such manner, that the starting materials are heated with the bases or boiled under reflux.

By addition of substances capable of combining the halogen hydride split off, without reacting with the starting material, for example, by addition of calcium carbonate, sodium carbonate and the like, the isomerizing and resinifying influence of the free halogen hydride produced may be suppressed or diminished.

Besides the reaction products enumerated, when treating the starting materials as described, a number of nitrogen containing by-products may be isolated. On cooling the reaction mixture according to their low solubility some of said by-products crystallize and may be removed from the reaction mixture. On thermic decomposition of said nitrogen containing by-products the nitrogen containing group is split off and besides other compounds the dienolon claimed may be isolated.

The $\Delta^{1,4}$-androstadienol-17-one-3 shows a powerful androgenic activity and, hence, may be employed for therapeutic purposes. By methods known per se it may be esterified, etherified, glucosified or transformed into other functional derivatives of the hydroxy group. Such derivatives, especially esters, may also be obtained on applying the process of the present invention to the corresponding derivatives of an androstanol-17-one-3 dihalogenated in ring A. Also said derivatives, especially the esters, are of powerful androgenic activity.

On the other hand the derivatives obtained according to the invention may be transformed to the free androstadienolon according to methods known per se.

The following examples serve to illustrate the invention, without, however, limiting the same to them.

Example 1

10 gs. of 2,4-dibromo-androstanol-17-one-3 are boiled in 125 ccs. of collidine for 45 minutes. After cooling the mixture is diluted with ether and decanted from the collidine salt formed. Then, it is washed subsequently with diluted sulfuric acid, soda solution and water. The neutral ethereal solution is dried over sodium sulfate and evaporated to dryness. The brown residue is dissolved in a mixture of benzene-benzine 1:1 and adsorbed on aluminium oxide according to Brockmann's method. From the eluate with the same mixture after evaporation of the solvents the $\Delta^{1,4}$-androstadienol-17-one-3 is obtained which after recrystallisation from aqueous methanol forms fine needles melting at 168–169° C. The yield amounts to 3 gs. Tested on the capon's comb it is more active than testosterone.

Example 2

14 gs. of androstanone-3-ol-acetate-17 melting at 157° are dissolved in 10 ccs. of glacial acetic acid and thereto is added at room temperature a mixture of some drops of a saturated solution of hydrogen bromide in glacial acetic acid. Within the course of half an hour a solution of 4.28 ccs. of bromine in 250 ccs. of glacial acetic acid is added while stirring. As soon as the color of the bromine has disappeared, water is carefully added by spraying whereby the crude 2,4-dibromo-androstanone-3-ol-acetate-17 separates as a flocculent precipitate. After standing for some time this product is filtered off and recrystallized from ethanol. The pure dibromo-androstanol-acetate forms colorless needles, melting at 194° C. under decomposition. Yield about 11.4 gs.

11.4 gs. of said substance are boiled for 45 minutes in 125 ccs. of collidine. After cooling the mixture is diluted with ether, decanted from the collidine salt formed and washed subsequently with diluted sulfuric acid, soda solution and water. The neutral ethereal solution is dried over sodium sulfate and evaporated to dryness. The brown residue is dissolved in a mixture of benzene-benzine 1:1 and adsorbed on aluminium oxide according to Brockmann's method. From the eluate with the same mixture, after evapration of the solvents and after recrystallisation from aqueous methanol, the $\Delta^{1,4}$-androstadienol-acetate-17-one-3 is obtained, forming light yellow needles melting at about 151–152° C. Its adsorption spectrum shows a high maximum at 235 m$\mu$. The yield amounts to 5.3 gs. When tested on the capon's comb this substance shows an androgenicactivity higher than that of testosteronacetate.

Example 3

By treating the $\Delta^{1,4}$-androstadienol-17-one-3 obtained according to Example 1 with propionic acid anhydride in pyridine the $\Delta^{1,4}$-androstadienolpropionate-17-one-3 is obtained on allowing the reaction mixture to stand for 24 hours at room temperature and then adding water thereto. The propionate precipitates in almost quantitative yield. After recrystallisation from methanol it forms small colorless leaflets melting at 138–139° C.

Example 4

1 g. of $\Delta^{1,4}$-androstadienolone are dissolved in 20 ccs. of pyridine and heated for 1 hour on the water bath with 5 ccs. of butyric acid anhydride. After cooling, to the yellow solution there is added water and the mixture extracted with ether. From the ethereal solution the pyridine and the butyric acid are removed by washing with a 10% solution of oxalic acid, diluted soda solution and water. After drying over sodium sulfate and evaporation the oily residue is dissolved in dilute acetone and cooled to −20° C.

In this manner the $\Delta^{1,4}$-androstadienol-butyrate-17-one-3 crystallizes in a good yield in the form of solid needles, meting at 70–73° C.

Example 5

3.7 gs. of the androstadienolonacetate obtained according to Example 2 are refluxed for 1½ hours with 50 ccs. of a 5% solution of potassium hydroxide in ethanol. After addition of water the $\Delta^{1,4}$-androstadienol-17-one-3 forms fine needles, which after recrystallisation from aqueous methanol melt at 169° C. Yield almost quantitative.

Example 6

0.1 gs. of androstadienolone are dissolved in 2 ccs. of pyridine and heated with 0.3 gs. of benzoic acid anhydride for 5 hours on the water bath. After addition of water the ethereal extract of the retraction mixture is freed from pyridine and benzoic acid by washing with a 10% solution of oxalic acid, 5% soda solution and water. The ethereal solution is dried over sodium sulfate and evaporated. The yellow residue is dissolved in a small amount of methanol and allowed to crystallize. The 17-benzoate of androstadienolone is obtained in solid, colorless needles melting at 215–216° C. in a yield of 55%.

Example 7

0.2 gs. of $\Delta^{1,4}$-androstadienol-17-one-3 are heated for 4 hours with 4 ccs. of valeric acid anhydride to 130° C. Then the solvent is removed by distillation in vacuo and the dark oily residue is dissolved in a mixture of benzene-benzine 1:1. This solution is filtered through a column of aluminium oxide according to Brockmann's method. After eluation with the same mixture and evaporation of the solvent the valerianate obtained crystallizes from a mixture of ether-petrolether in the form of small cubes melting at 76–77° C.

Of course, many other changes and variations in the reaction conditions, the solvents used, temperature and duration of reaction, working up and purification of the reaction products, and the like may be made by those skilled in the art in accordance with the principles set forth herein and in the claims annexed hereto.

What we claim is:

1. In a process for the manufacture of valuable steroid hydroxy ketones which are twofold unsaturated in ring A, the step which comprises heating an androstanol-17-one-3 dihalogenated in ring A with collidine until halogen hydride is split off.

2. In a process for the manufacture of valuable hydroxy derivatives of steroid hydroxy ketones which are twofold unsaturated in ring A, the step which comprises heating a hydroxy derivative of androstanol-17-one-3 dihalogenated in ring A with collidine until halogen hydride is split off.

3. Process for the manufacture of valuable steroid hydroxy ketones which are twofold unsaturated in ring A, comprising heating an androstanol-17-one-3 dihalogenated in ring A with collidine to split off halogen hydride and thereby form two double bonds in ring A, and isolating the product twofold unsaturated in ring A from the reaction mixture.

4. Process according to claim 3, wherein the halogens are in the 2- and 4-positions.

5. Process according to claim 3, comprising employing 2,4-dichloro-androstanol-17-one-3 as starting material.

6. Process according to claim 3, comprising employing 2,4-dichloro-androstanolacetate-17-one-3 as starting material.

7. Process according to claim 3, comprising employing 2,4-dibromo-androstanolacetate-17-one-3 as starting material.

HANS HERLOFF INHOFFEN.
GERHARD ZÜHLSDORFF.

REFERENCES CITED

The following references are of record in the file of this patent:

UNITED STATES PATENTS

| Number | Name | Date |
|---|---|---|
| 2,153,700 | Serini | Apr. 11, 1939 |
| 2,143,453 | Ruzicka | Jan. 10, 1939 |

FOREIGN PATENTS

| Number | Country | Date |
|---|---|---|
| 500,353 | Great Britain | Jan. 31, 1939 |

OTHER REFERENCES

Ruzicka, Helv. Chim. Acta., vol. 18, 1935, pages 1274–1275.